United States Patent [19]

Bialobrzeski

[11] 4,235,427
[45] Nov. 25, 1980

[54] SPRING

[76] Inventor: Walter Bialobrzeski, 68 Summerwood Rd., Wallingford, Conn. 06492

[21] Appl. No.: 36,530

[22] Filed: May 7, 1979

Related U.S. Application Data

[63] Continuation-in-part of Ser. No. 902,256, May 2, 1978, which is a continuation-in-part of Ser. No. 387,948, Aug. 13, 1973, abandoned.

[51] Int. Cl.³ ............................................. F16F 1/36
[52] U.S. Cl. ................................... 267/153; 267/63 R
[58] Field of Search ................... 267/63 A, 63 R, 136, 267/141, 149, 152, 153, 65 B

[56] References Cited

U.S. PATENT DOCUMENTS

| 1,705,037 | 3/1929 | Taub | 267/63 R X |
| 3,037,764 | 6/1962 | Paulsen | 267/63 R |
| 3,118,659 | 1/1964 | Paulsen | 267/153 X |
| 3,160,407 | 12/1964 | Vaugoyeau | 267/63 R X |
| 3,201,111 | 8/1965 | Afton | 267/153 |
| 3,412,990 | 11/1968 | Gladston | 267/63 R |

Primary Examiner—Duane A. Reger
Attorney, Agent, or Firm—DeLio and Montgomery

[57] ABSTRACT

A plastic spring element defined by inner and outer convolutions of different thickness defined by radii and with tapered walls extending therebetween.

18 Claims, 9 Drawing Figures

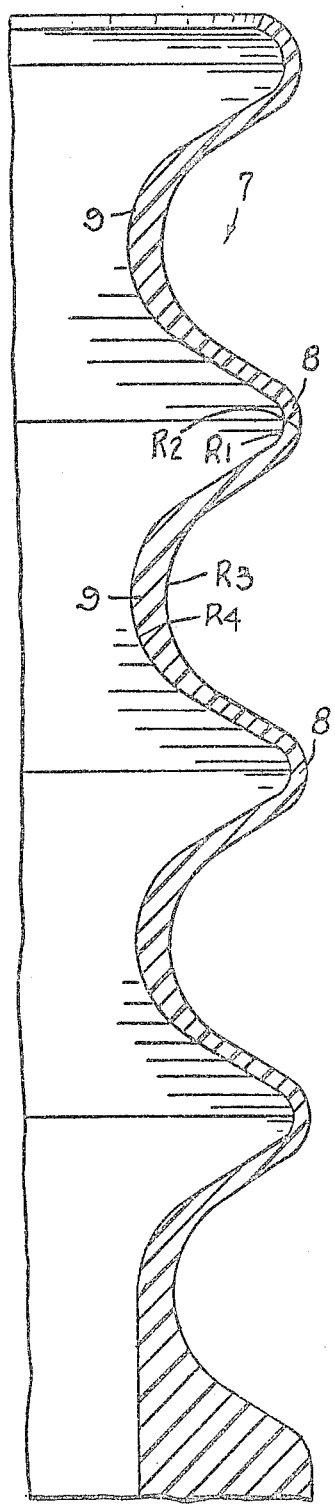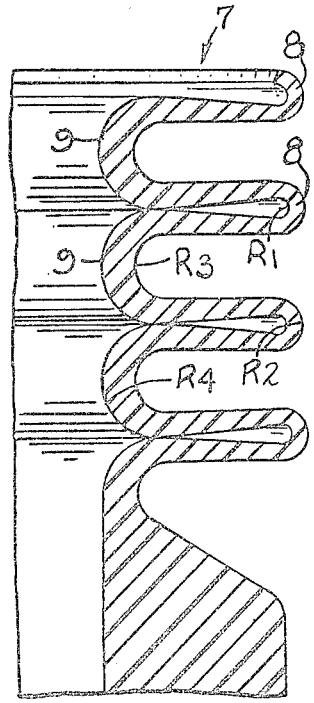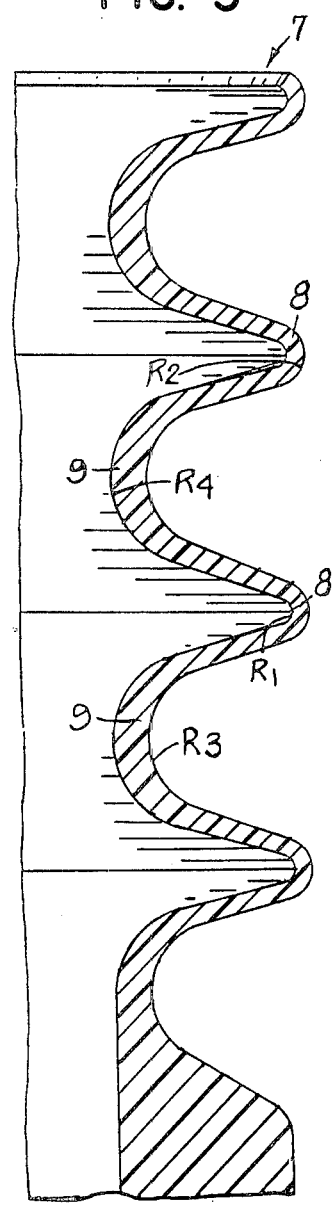

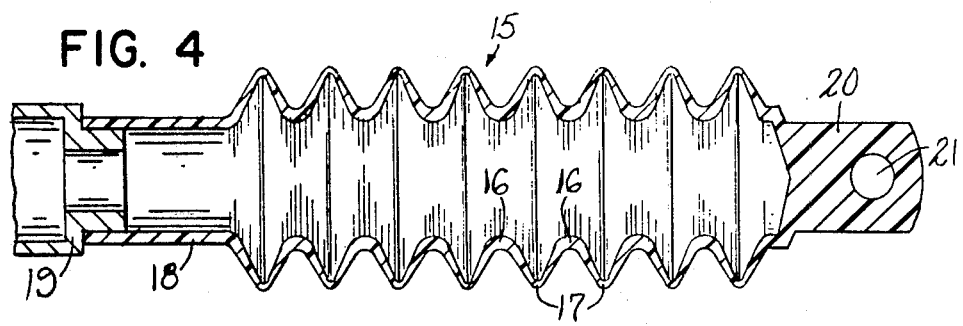
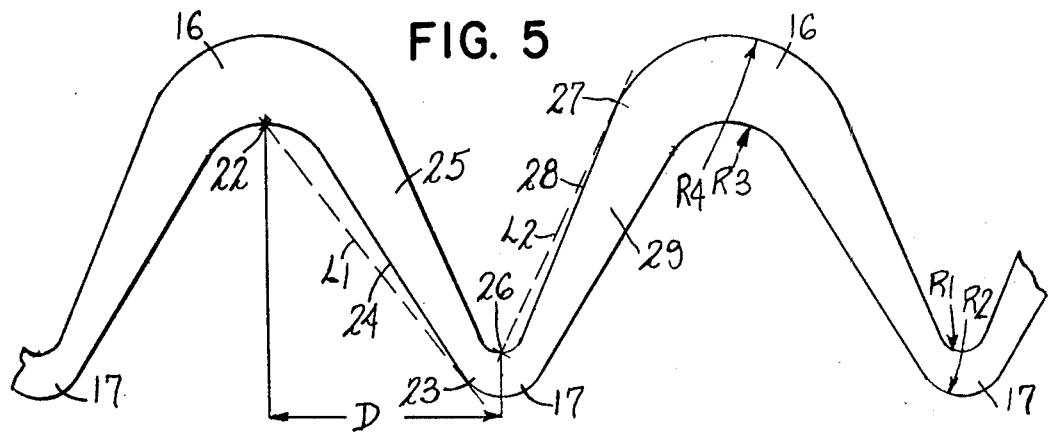
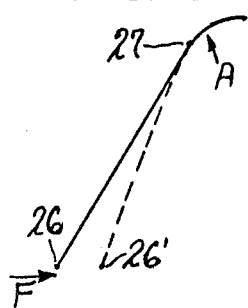
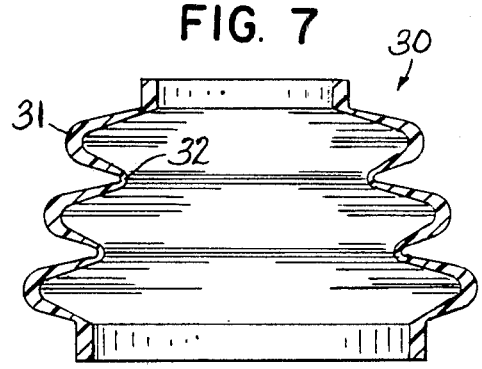
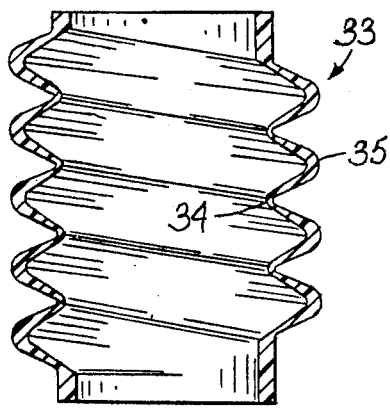
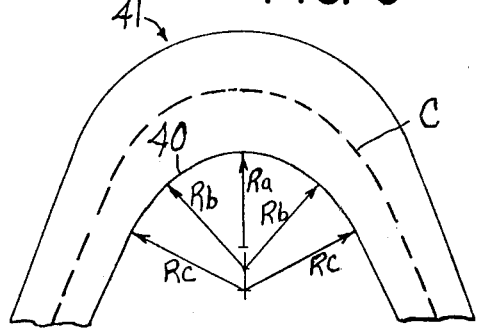

SPRING

This application is a continuation-in-part of co-pending application Ser. No. 902,256, filed May 2, 1978 which was a continuation-in-part of Ser. No. 387,948, filed Aug. 13, 1973, now abandoned.

This invention relates to springs and more particularly relates to springs made of a plastic material.

A spring embodying the invention is formed of a plastic material with inner and outer convolutions defined on radii such that one of the inner or outer convolutions is thicker than the other and the wall portions extending therebetween are of tapering thickness. The dimensions of the radii and wall thickness, together with the type of material, determine the characteristics of the spring.

The spring is initially made to a given axial dimension, preferably by molding in a manner disclosed and claimed in co-pending application Ser. No. 36,531 filed on the same date as this application. Thereafter, it is compressed and stressed. When the initial compressive force is released, the spring regains only a part of its original length, taking a permanent set and being more resilient. Most of the set takes place in the thinner walled convolutions.

A spring embodying the invention will have many applications within its load limits. The spring may be formed of a pure thermoplastic, or a plastic with filler such as glass fibers, graphite, talc, etc., dependent on the desired parameters of the spring.

An object of this invention is to provide a new and improved spring of plastic material.

Another object of this invention is to provide a new and improved spring of plastic material which may be made in large volumes through molding.

A further object of this invention is to provide a spring of the type described wherein the spring parameters are determined by the relative dimensioning of convolution thickness and material.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIGS. 1-3 represent, on an enlarged scale, details of the formation of the springs according to the invention;

FIG. 4 is a longitudinal view in section of a spring embodying the invention;

FIG. 5 is an enlarged representation of the convolutions V of FIG. 4;

FIG. 6 is a diagram useful in understanding the operation of the spring;

FIG. 7 is a view in section of a spring of generally frusto-conical outline;

FIG. 8 is a view in longitudinal section of a spring with helical convolutions; and FIG. 9 is a view in section of a convolution of a spring embodying the invention.

A spring 7 embodying the invention has outer convolutions 8 of a thickness defined by the radii $R_1$ and $R_2$, and inner convolutions 9 defined by radii $R_3$ and $R_4$. The walls of the spring are of tapering thickness between the inner and outer convolutions. The radii $R_1$ and $R_2$, and $R_3$ and $R_4$ determine the convolution thickness, and this together with other dimensioning of the spring and the material determine the spring rate. After forming of the spring element 7, it is initially compressed until it bottoms or essentially bottoms, as shown in FIG. 2. Upon release of the initial set, the spring returns to a stable length which may be ten to forty percent shorter than the original length. As originally formed, the spring is rather stiff, but upon the initial compression becomes more resilient.

During the initial compression, most of the set takes place in the thinner convolutions 8, although some of the set does take place in the thicker walled convolutions.

At the present time, a preferred plastic is acetal. Other materials useful in the manufacture of spring elements embodying the invention include polyethylene, polypropylene, polyurethane, tetrafluoroethylene, nylon, and flexible PVC. The parameters of the spring and the spring rate will depend upon the thickness of the convolutions defined by the radii $R_1$ and $R_2$, and $R_3$ and $R_4$, the material of the spring, and the relative diametric and axial dimensioning of the convolutions.

A uniformly thin walled spring would tend to take a greater permanent set and would not adequately resist compression. A uniformly thick walled spring would tend to be too stiff throughout its compression range.

The spring is preferably formed by molding either injection or blow molding or in a two step injection and blow molding operation, as described in co-pending application Ser. No. 36,531 filed on the same date as this application, the disclosure of which is incorporated by reference.

FIG. 4 exemplifies an embodiment of a spring 15 embodying the invention having thicker inner convolutions 16 and thinner outer convolutions 17. The spring may be formed with a cylindrical end portion 18 adapted to mate with a spring seat 19 and also be formed with an integral tab 20 having an aperture 21 adapted to receive a pin or other connection device.

Reference is now made to FIG. 5, which shows an enlarged portion of the spring of FIG. 4. This spring is formed with the smaller radii $R_1$ and $R_2$ defining the thickness of convolution 17 and radii $R_3$ and $R_4$ defining the thickness of the convolution 16.

It may be noted that if a line L1 is drawn between the center point of the inner ridge defined by radius $R_3$, which is at a point 22 to a point of tangency 23 with the ridge of the convolution defined by radius $R_2$, such line L1 is outside of the surface 24 defining tapered wall portion 25. Similarly, line L2 drawn between the center point 26 of convolution 17 at the line defined by radius $R_1$ to the tangent point 27 on the adjacent ridge defined resides outside of surface 28 of tapered wall portion 29.

This permits a bending of the tapering walls 25 and 29 as load is applied to the spring. If either of the radii R or R should be formed so small that there was essentially an apex and the lines L1 and L2 coincided with the adjacent surfaces of the convolutions, compression of the spring due to bending or flexing at the convolutions would be very difficult, if not impossible. It is the application of the force when the spring is compressed which permits convolution 17 to move toward convolution 16 along the dimension D.

Assume the point 27 at the thicker wall convolution is fixed and does not move under compression and a force F (FIG. 6) is applied longitudinally of the spring at point 26. Due to the arc A along surface 28, the point 26 may move towards the point 26'. If the surface between point 26 and point 27 should be a straight line, then no deflection or extremely little deflection would occur. Any deflection would occur only in the tapering walls between convolutions.

A spring embodying the invention may take different configurations. As shown in FIG. 7, a spring 30 embodying the invention has outer convolutions 31 which are thicker than the inner convolutions 32. The spring 30 may be made in a general frusto-conical shape and a spring 33, as shown in FIG. 8, may be made with helical convolutions 34 and 35 where the outer convolutions are thicker.

The convolutions of the spring may be described as having ridges defined by the radii $R_2$ and $R_4$, and valleys defined by the radii $R_1$ and $R_3$.

It is to be understood that the term "radii" as used herein to define the shape of the convolution walls, also includes the arcuate walls or ridges and valleys (external and internal) of the convolutions being formed on a plurality of radii, as for example Ra, Rb, and Rc as shown defining the inner arcuate portion 40 of a convolution 41. It is the arc of the convolutions, as exemplified in FIG. 6, which enables the convolutions to fold and provide the spring action.

The element as initially formed is rather stiff and does not have sufficient resiliency to function as a spring. After forming, the element is compressed axially so that the yield point of the plastic is exceeded and the element takes a preset or set of lesser axial dimension. It is believed that when the yield point is exceeded, the molecular chains of the plastic material, which were initially random, are stressed and at least partially oriented in the direction of the applied stress; that is, following the convolutions as seen in axial cross-section. In FIG. 9, the broken line C indicates the direction of the applied stress. This permits subsequent bending or flexing of the walls extending between convolutions 5 and 6 about the convolutions.

As the element is initially precompressed, the outer convolutions move radially outwardly and there is an elongation of the plastic material, and as such elongation goes beyond the yield point of the material, the aforementioned stress and molecular orientation is believed to occur. Upon release of the preset compressive force, the element recovers to a lesser axial dimension, is resilient and becomes a spring. Thereafter, upon compression and release, it will return to its preset axial dimension.

The radii defining the convolutions and the arcs at the valleys must be sufficiently large with respect to the wall thickness so that bending of the walls about the arcs can occur.

Thereafter, when the element becomes a spring, its resiliency is due to the ability of the walls (A and B, FIG. 4) defining the convolutions to bend or flex in an axial direction, and recover due to the residual internal stresses in the plastic and the defined radii of the convolutions. The action is unlike an elastomer where resiliency is due to the elastic deformation of the elastomeric material.

The walls of the element are made of sufficient thickness in relation to overall diameter and length so that the spring is axially stable, i.e. it does not tend to be flexible transverse to the longitudinal axis.

The convolutions are generally annular as seen perpendicular to the longitudinal axis. This permits the diameter to grow uniformly as the spring is compressed and the convolutions come closer together.

By way of example, one spring made of acetal in accordance with the invention had the following as formed dimensions:

R1 = 0.012"
R2 = 0.030"
R3 = 0.030"
R4 = 0.060"
Distance between similar convolutions = 0.25"
Overall Length = 1.274"
Outside Diameter = 1.224"

The element had little resiliency as initially formed. In fact, it was relatively stiff. The element was initially compressed in a C-clamp to a dimension of 0.578". After the compressive force was released, it recovered to an axial dimension of 1.195" and was quite resilient in the axial dimension. After repeated compressions, it always returned to the axial dimension of 1.195".

While the spring was initially compressed, the outside diameter grew to 1.256", indicating there was an elongation of the material in the walls between inner and outer convolutions.

It is preferred, due to such elongation, that the thinner walled convolutions be on the outside.

Springs embodying the invention may be formed with a reinforcing filler such as glass fibers or carbon if greater strength is desired.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A spring element comprising a longitudinally extending hollow body member of plastic material having a longitudinal axis with inner and outer convolutions along the length thereof, said inner and outer convolutions being of different thickness, said element being hollow with at least one end unenclosed, said convolutions having inner valleys and outer ridges, said valleys and ridges defined on radii which determine the thickness of said convolutions, and the wall portions extending between said convolutions are of tapering thickness, said element being precompressed along said longitudinal axis to a degree sufficient to cause the material thereof to exceed its yield point at least in said convolutions and give it a permanent set of decreased axial dimension in an unloaded condition and impart resilience thereto in the axial direction, the predominant set of said element occurring in the thinner walled convolutions, said convolutions being of essentially annular shape perpendicular to the longitudinal axis.

2. A spring element according to claim 1 wherein the radially outer wall portions are thicker than the radially inner wall portions thereof.

3. A spring element according to claim 1 wherein the radially inner wall portions are thicker than the radially outer wall portions thereof.

4. A spring element according to claim 1 wherein the spring is frusto-conical.

5. A spring element according to claim 1 wherein the convolutions are disposed helically.

6. The spring element of claim 1 wherein said plastic material contains a reinforcing filler.

7. The spring element of claim 6 wherein said filler is glass fibers.

8. The spring element of claim 6 wherein said filler is carbon.

9. The spring of claim 1 wherein said spring element is formed with an integral connection tab at one end thereof.

10. The spring element of claim 1 wherein the convolutions have ridges and valleys and a line drawn from the center of a valley of one convolution to a point of tangency on the ridge of an adjoining ridge is without the surface of the wall extending from said valley to said point of tangency.

11. The spring element of claim 1 wherein each radius may be a plurality of different radii.

12. A spring element comprising a longitudinally extending hollow body member of plastic material having a longitudinal axis with convolutions along the length thereof, said element being hollow with at least one end unenclosed, said convolutions having inner and outer arcuate ridges and valleys which define the thickness of the convolutions, the thicknesses of the inner and outer convolutions being of unequal dimension and the wall portions extending between said ridges are of tapering thickness, said element being precompressed along said longitudinal axis to a degree sufficient to give it a permanent set of decreased axial dimension in an unloaded condition and impart resilience thereto in the axial direction, the predominant set of said spring occurring in the thinner walled convolutions, said convolutions being of essentially annular shape perpendicular to the longitudinal axis.

13. A spring according to claim 12 wherein the outer convolutions are thicker than the radially inner wall portions thereof.

14. A spring according to claim 12 wherein the inner convolutions are thicker than the radially outer wall portions thereof.

15. A spring according to claim 12 wherein the spring is frusto-conical.

16. A spring according to claim 12 wherein the convolutions are disposed helically.

17. The spring of claim 12 wherein a line drawn from the center of a valley of one convolution to a point of tangency on the ridge of an adjacent ridge is without the surface of the wall extending from said valley to said point of tangency.

18. The spring of claim 12 wherein each valley and ridge is defined by one or more radii.

* * * * *